US012608756B2

(12) United States Patent
Ochiai

(10) Patent No.: US 12,608,756 B2
(45) Date of Patent: Apr. 21, 2026

(54) IMAGE PROCESSING DEVICE CONFIGURED TO PERFORM RESOLUTION CONVERSION, CONTROL METHOD FOR THE SAME, AND STORAGE MEDIUM

(71) Applicant: CANON KABUSHIKI KAISHA, Tokyo (JP)

(72) Inventor: Tsubasa Ochiai, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 511 days.

(21) Appl. No.: 18/058,608

(22) Filed: Nov. 23, 2022

(65) Prior Publication Data

US 2023/0171361 A1 Jun. 1, 2023

(30) Foreign Application Priority Data

Nov. 30, 2021 (JP) ................................. 2021-193805

(51) Int. Cl.
*G06T 3/403* (2024.01)
*G06T 7/13* (2017.01)
*H04N 1/40* (2006.01)

(52) U.S. Cl.
CPC ................ *G06T 3/403* (2013.01); *G06T 7/13* (2017.01); *H04N 1/40068* (2013.01)

(58) Field of Classification Search
CPC .. G06T 3/403; G06T 7/13; G06T 3/40; G06T 3/4007; G06T 3/4023; G06T 3/4053; G06T 3/4069; G06T 3/4076; H04N 1/393; H04N 1/3935; H04N 1/40068; H04N 1/409; H04N 1/4092
See application file for complete search history.

(56) References Cited

U.S. PATENT DOCUMENTS

| 10,440,227 | B2 | 10/2019 | Uekusa | |
| 2008/0137962 | A1* | 6/2008 | Asano | H04N 1/40062 358/1.9 |
| 2015/0363910 | A1* | 12/2015 | Sun | G06T 7/13 382/300 |
| 2016/0364839 | A1* | 12/2016 | Duan | G06T 3/4007 |
| 2017/0339309 | A1 | 11/2017 | Uekusa | |

(Continued)

FOREIGN PATENT DOCUMENTS

| JP | 2005123813 A | 5/2005 |
| JP | 2010062610 A | 3/2010 |
| JP | 2017208739 A | 11/2017 |

OTHER PUBLICATIONS

Radha, Vallapu and P. Chandra Sekhar. "Comparison of Robert, Prewitt, Sobel Operators Based Edge Detection Methods," IJVDCS, vol. 4, Issue 9, Sep. 2016, pp. 882-885. (Year: 2016).*

*Primary Examiner* — Geoffrey E Summers
(74) *Attorney, Agent, or Firm* — Canon U.S.A., Inc. IP Division

(57) ABSTRACT

An image processing device configured to convert image data of a first resolution into image data of a second resolution higher than the first resolution includes at least one memory, and at least one processor in communication with the at least one memory and configured to cooperate with the at least one memory to calculate a direction and an intensity of an edge from the image data of the first resolution, and determine a pattern for the image data of the second resolution to be replaced by pixels of the image data of the first resolution, based on the direction and the intensity of the edge.

10 Claims, 12 Drawing Sheets

(56)         References Cited

U.S. PATENT DOCUMENTS

2018/0150934 A1*  5/2018  Kasagi ................... G06F 17/17
2019/0096031 A1*  3/2019  Yang ..................... G06T 3/4007
2020/0219229 A1*  7/2020  Sundaram ............. G06T 7/0002

* cited by examiner

| -1 | 0 | 1 |
|----|---|---|
| -2 | 0 | 2 |
| -1 | 0 | 1 |

FIG.5B

| 1  | 2  | 1  |
|----|----|----|
| 0  | 0  | 0  |
| -1 | -2 | -1 |

|  |  | sobel_h | | | | | | | |
|---|---|---|---|---|---|---|---|---|---|
|  |  | 0 | 1 | 2 | 3 | 4 | 5 | 6 | 7 |
| sobel_v | 0 | 0 | 0 | 0 | 1 | 1 | 1 | 1 | 1 |
|  | 1 | 0 | 0 | 0 | 1 | 1 | 1 | 1 | 1 |
|  | 2 | 0 | 0 | 0 | 1 | 1 | 1 | 1 | 1 |
|  | 3 | 2 | 2 | 2 | 3 | 3 | 3 | 3 | 3 |
|  | 4 | 2 | 2 | 2 | 3 | 3 | 3 | 3 | 3 |
|  | 5 | 2 | 2 | 2 | 3 | 3 | 3 | 3 | 3 |
|  | 6 | 2 | 2 | 2 | 3 | 3 | 3 | 3 | 3 |
|  | 7 | 2 | 2 | 2 | 3 | 3 | 3 | 3 | 3 |

| INPUT | OUTPUT |
|-------|--------|
| 0 | 0 |
| 1 | 2 |
| 2 | 3 |
| 3 | 4 |
| 4 | 5 |
| 5 | 6 |
| 6 | 7 |
| 7 | 8 |
| 8 | 9 |
| 9 | 10 |
| 10 | 11 |
| 11 | 12 |
| 12 | 13 |
| 13 | 14 |
| 14 | 15 |
| 15 | 16 |

FIG.9A
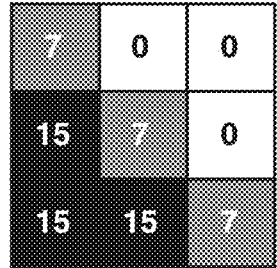
FIG.9B
| | x | | | |
|---|---|---|---|---|
| | 6 | 10 | 13 | 15 |
| | 3 | 7 | 11 | 14 |
| y | 1 | 4 | 8 | 12 |
| | 0 | 2 | 5 | 9 |
FIG.9C
FIG.9D
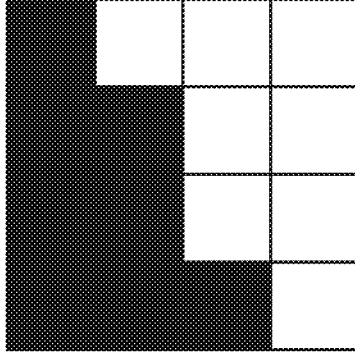

FIG.12A

| | x | | | |
|---|---|---|---|---|
| | 9 | 5 | 2 | 0 |
| y | 12 | 8 | 4 | 1 |
| | 14 | 11 | 7 | 3 |
| | 15 | 13 | 10 | 6 |

FIG.12B

| | x | | | |
|---|---|---|---|---|
| | 0 | 2 | 5 | 9 |
| y | 1 | 4 | 8 | 12 |
| | 3 | 7 | 11 | 14 |
| | 6 | 10 | 13 | 15 |

FIG.12C

| | x | | | |
|---|---|---|---|---|
| | 6 | 10 | 13 | 15 |
| y | 3 | 7 | 11 | 14 |
| | 1 | 4 | 8 | 12 |
| | 0 | 2 | 5 | 9 |

IMAGE PROCESSING DEVICE CONFIGURED TO PERFORM RESOLUTION CONVERSION, CONTROL METHOD FOR THE SAME, AND STORAGE MEDIUM

BACKGROUND

Field of the Disclosure

The present disclosure relates to a technique of resolution conversion to be performed on image data after halftone processing.

Description of the Related Art

An image forming apparatus with a 600-dpi or 1200-dpi engine or even a high resolution engine such as a 2400-dpi or 4800-dpi engine has been developed. With such development, high resolution rendering and high resolution image processing have been available, which enables printing that provides an output product of high image quality. On the other hand, in a case where image processing is performed on image data of high resolution, the number of pixels increases and circuit scale is enlarged. Examples of the image processing include halftone processing (also referred to as screen processing). In the screen processing, basically, a portion corresponding to one main scanning line is extracted from an image and processed with a high speed line buffer for the purpose of acceleration. The processing operation is repeated as many times as the number of pixels aligned in a sub-scanning direction. The number of pixels of image data of 2400×2400 dpi is four times as large for main scanning and four times as large for sub-scanning as the number of pixels of image data of 600×600 dpi. Thus, if halftone processing at 2400×2400 dpi is to be performed in the same time as the processing time of halftone processing at 600×600 dpi, a processing speed 16 times as high as the processing speed for the processing at 600×600 dpi is required, resulting in enlargement of the circuit scale.

To address this, a technique for improving halftone processing performed on a high resolution image in an image forming apparatus is discussed in Japanese Patent Application Laid-Open No. 2017-208739. In Japanese Patent Application Laid-Open No. 2017-208739, screen processing is initially performed on 600-dpi image data, then pattern matching is used to convert the 600-dpi image data into image data of a higher resolution. This enables image data having been subjected to the screen processing at a resolution lower than an engine resolution to be matched with the engine resolution. More specifically, pattern matching is used to detect an edge portion in an image and convert the edge portion into a group of pixels where a smoothing effect is achieved. The pixels thus obtained are made to be pixels of high resolution image data. This makes it possible to generate such a halftone image of high resolution as having an edge portion where the smoothing effect is achieved, while restricting the circuit scale.

The circuit scale is not adequately reduced with the measures as described above. The reason is that, while the screen processing itself is performed in 600-dpi units, patterns used for the pattern matching have to be held in a memory and, moreover, a process for making comparison with the held patterns is performed. In Japanese Patent Application Laid-Open No. 2017-208739, 104 patterns are to be held and the process for making comparison is to be performed on 9×9 pixels for each held pattern. In order to reduce the circuit scale, if the patterns are decreased in number and/or the window size is reduced, the smoothing effect based on the pattern matching becomes inadequate.

SUMMARY

According to an aspect of the present disclosure, an image processing device configured to convert image data of a first resolution into image data of a second resolution higher than the first resolution includes at least one memory, and at least one processor in communication with the at least one memory and configured to cooperate with the at least one memory to calculate a direction and an intensity of an edge from the image data of the first resolution, and determine a pattern for the image data of the second resolution to be replaced by pixels of the image data of the first resolution, based on the direction and the intensity of the edge.

Further features of various embodiments will become apparent from the following description of exemplary embodiments with reference to the attached drawings.

BRIEF DESCRIPTION OF THE DRAWINGS

FIG. 3 is a diagram illustrating a configuration of a resolution conversion section.

FIGS. 5A and 5B are each a diagram illustrating an example of filter coefficients used to calculate the edge direction and the edge intensity.

FIG. 6 is a diagram illustrating an example of a two-dimensional matrix for calculating a pattern number (identifier, [id]) from the edge intensity.

FIG. 7 is a diagram illustrating an example of a one-dimensional lookup table for modulating a 4-bit signal value to a 5-bit signal value.

FIGS. 9A to 9D are diagrams illustrating a series of operations to be performed by the resolution conversion section to subject a pixel of interest to the resolution conversion.

FIGS. 12A to 12C are diagrams illustrating a series of operations for conversion pattern acquisition in the second exemplary embodiment.

DESCRIPTION OF THE EMBODIMENTS

In the following, exemplary embodiments of the present disclosure will be described with respect to the accompanying drawings. Configurations presented in the exemplary embodiments below are each a mere example, and the present disclosure is not limited to the illustrated configurations.

A first exemplary embodiment of the present disclosure will be described below. In the present exemplary embodiment, a description will be provided, as an example of an image forming apparatus, of an electrophotographic digital multifunction peripheral (hereinafter, referred to as MFP) having multiple functions, such as copying, printing, and faxing. The present exemplary embodiment, however, is not limited to such apparatuses but is applicable to apparatuses employing other processes, such as an inkjet method.

Figure 1:
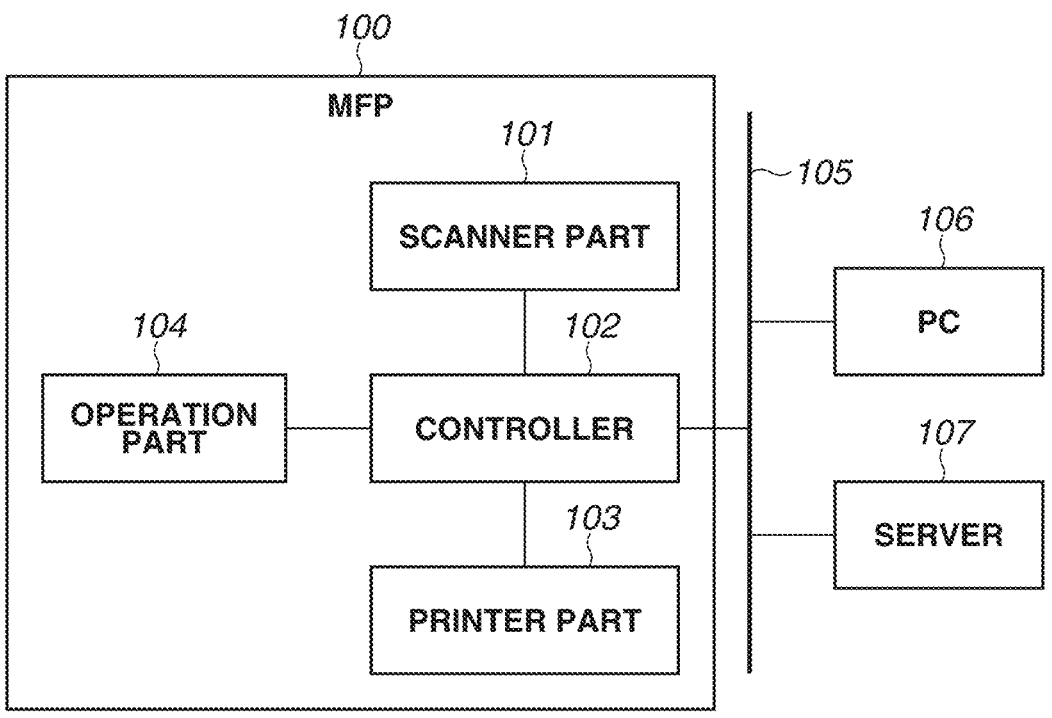
FIG. 1 is a diagram illustrating a configuration of an image forming apparatus according to an exemplary embodiment of the present disclosure.

FIG. 1 is a schematic block diagram illustrating a configuration of an MFP 100 according to the present exemplary embodiment. The MFP 100 includes a scanner part 101, a controller 102, a printer part 103, and an operation part 104.

The scanner part 101 optically reads an image of an original to acquire the image as image data.

The controller 102 includes a central processing unit (CPU), a read-only memory (ROM), and a random access memory (RAM), and subjects the image data read by the scanner part 101, for instance, to predetermined image processing. The image data having been subjected to image processing is stored in the RAM in the controller 102.

The printer part 103 forms an image on a recording sheet in an electrophotographic manner, according to print setting conditions designated for the image data having been subjected to the image processing. The printer part 103 according to the present exemplary embodiment is assumed to perform printing at an engine resolution of 2400×2400 dpi, 1 bit. A resolution of 1200 dpi or 4800 dpi may also be employed.

The operation part 104 is a user interface for a user to perform various operations. For instance, the user sets various printing conditions for image data serving as a printing target using the operation part 104.

A server 107 that manages image data, a personal computer (PC) 106 that instructs the MFP 100 to perform printing, and the like are connected to the MFP 100 via a network 105. If printing is instructed of by the server 107 or the PC 106, the controller 102 rasterizes image data transmitted from the server 107 or the PC 106 to convert the image data into image data (bitmap data) supported by the printer part 103, and stores the resultant image data in the RAM.

Figure 2:
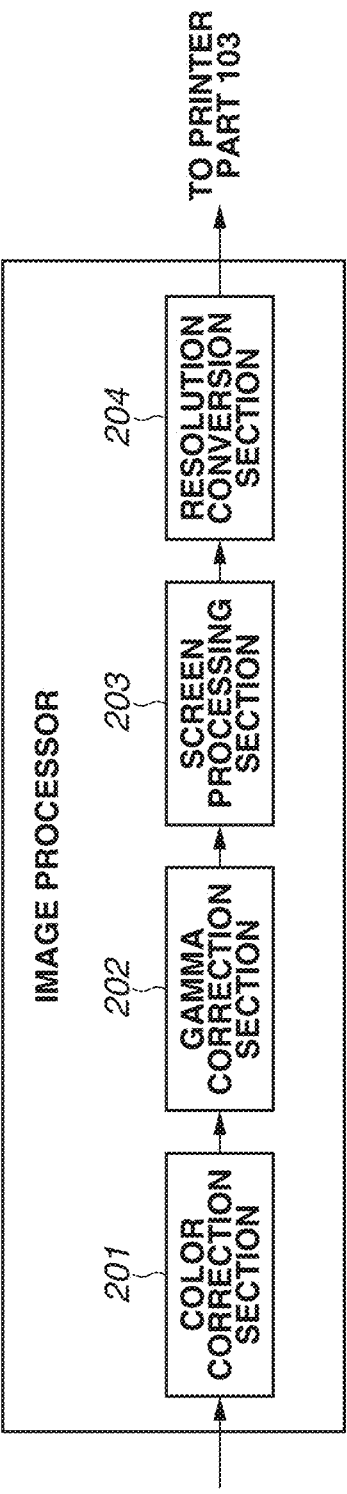
FIG. 2 is a diagram illustrating a configuration of an image processor for printing.

Next, image processing for printing to be performed in the controller 102 is described. FIG. 2 is a block diagram illustrating an internal arrangement of an image processor serving as a functional part in charge of image processing. An image processor 200 according to the present exemplary embodiment includes a color correction section 201, a gamma correction section 202, a screen processing section 203, and a resolution conversion section 204.

The color correction section 201 performs a color correction process on image data (bitmap data) acquired from the RAM. More specifically, a color conversion lookup table (LUT) or matrix operation is used to convert the image data into image data in a cyan-magenta-yellow-black (CMYK) color space where densities are expressed with four colors (image signals) of CMYK. The image data after conversion has an 8-bit value (0 to 255) every pixel for each color.

The gamma correction section 202 performs a process for correcting the input CMYK image data using a one-dimensional LUT (such a process is referred to as a gamma correction process), so that an image having been transferred to a recording sheet has desired density characteristics.

The screen processing section 203 performs screen processing on the input image data to generate screen data (or halftone image data, which is hereinafter referred to as a halftone (HT) image). The HT image is assumed to have a general bit format, namely, a 1- through 4-bit format. The generated HT image is transmitted to the resolution conversion section 204.

The resolution conversion section 204 performs a resolution conversion process to be described below on the HT image received from the screen processing section 203. In the present exemplary embodiment, a description is provided of a case where a 4-bit image of 600×600 dpi is converted into a 1-bit image of 2400×2400 dpi.

Resolution Conversion Process

Figure 3:
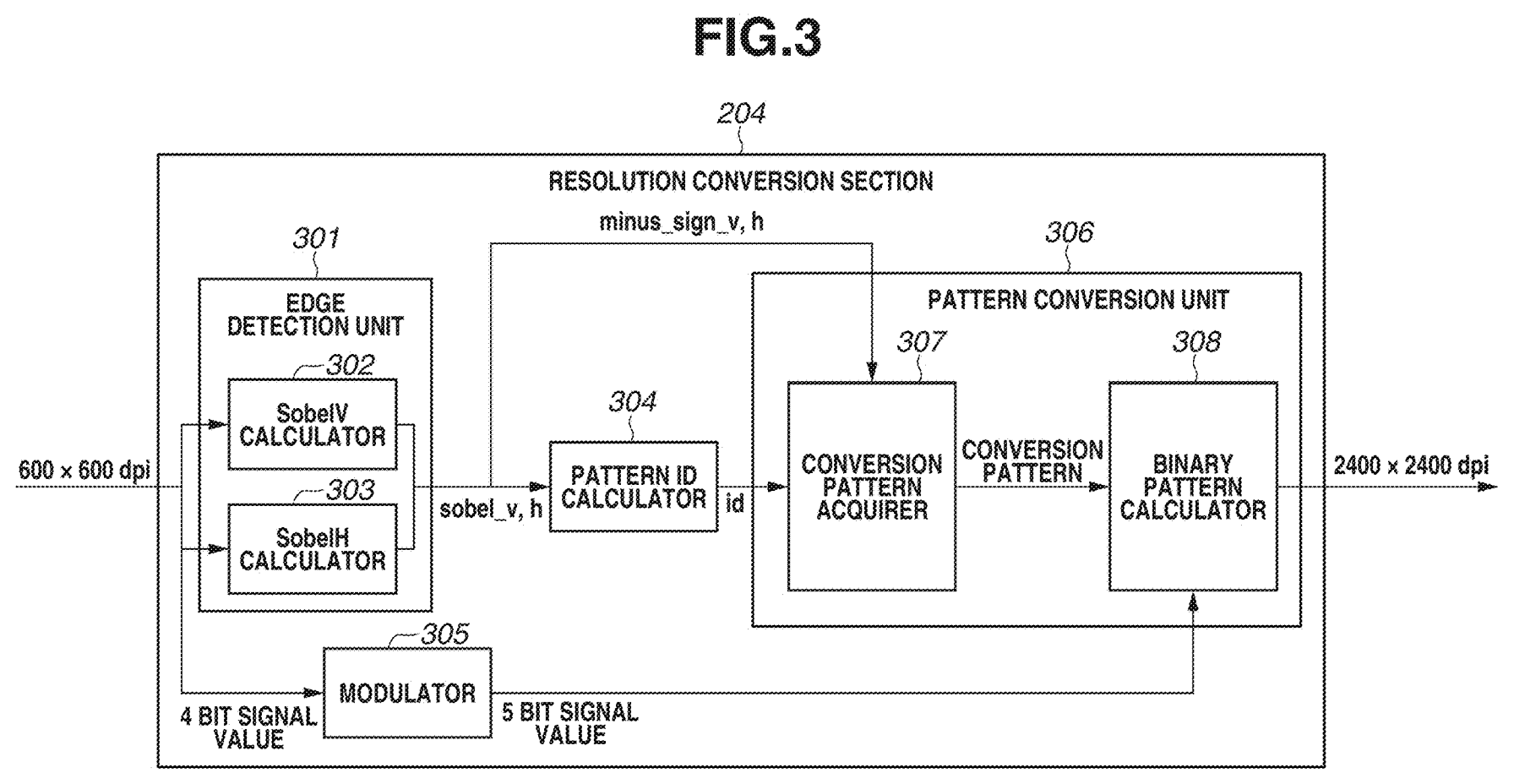

The resolution conversion process to be performed by the resolution conversion section 204 will now be detailed with reference to FIG. 3. FIG. 3 is a block diagram illustrating an internal arrangement of the resolution conversion section 204. The resolution conversion section 204 includes an edge detection unit 301, a pattern identifier (ID) calculator 304, a modulator 305, and a pattern conversion unit 306. The edge detection unit 301 includes a SobelV calculator 302 and a SobelH calculator 303. The pattern conversion unit 306 includes a conversion pattern acquirer 307 and a binary pattern calculator 308.

Edge Detection Unit 301

The edge detection unit 301 (the SobelV calculator 302 and the SobelH calculator 303) calculates vertical and horizontal edge intensities and directions, and outputs the edge intensities to the pattern ID calculator 304 and the edge directions to the conversion pattern acquirer 307.

Figure 4:
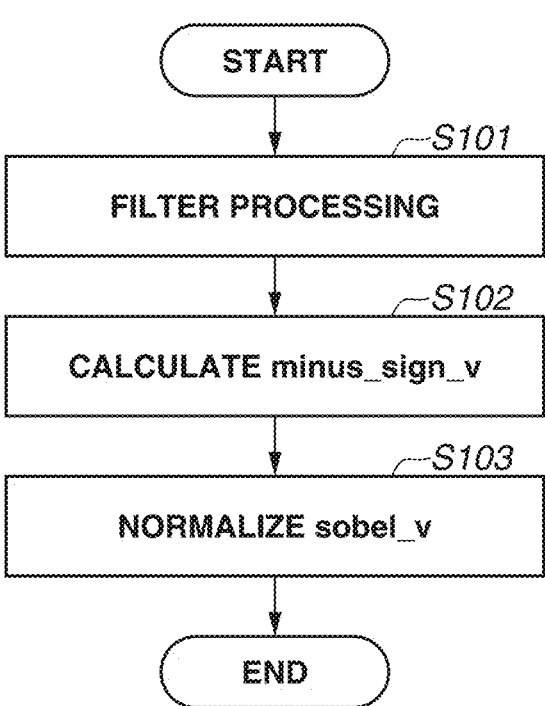
FIG. 4 is a flowchart of a process for calculating edge direction and edge intensity.

The SobelV calculator 302 in the edge detection unit 301 calculates a vertical edge intensity represented by sobel_v and a vertical edge direction represented by minus_sign_v. Such calculation is detailed with reference to FIG. 4. FIG. 4 is a flowchart of a process to be performed by the SobelV calculator 302, and the entire process, described in conjunction with FIG. 4, is performed by the SobelV calculator 302.

In step S101, for the HT image generated by the screen processing section 203, convolution operation using filter coefficients is performed on an area with a width of three pixels and a height of three pixels that centers around a pixel of interest in a reference region, to calculate the sobel_v. In the present exemplary embodiment, a Sobel filter illustrated in FIG. 5A that allows the detection of a vertical edge is used for the description, while any known filter coefficients allowing edge detection may be used. The HT image in the present exemplary embodiment is a 4-bit image (with values 0 to 15), so that a minimum value of the sobel_v is -60 and a maximum value is 60 as a result of convolution with filter coefficients illustrated in FIG. 5A.

In step S102, the minus_sign_v is set to 0 if the sobel_v is positive or to 1 if the sobel_v is negative, and then the resultant is output to the pattern conversion unit 306.

In step S103, the sobel_v obtained by the calculation in step S101 is normalized. More specifically, an absolute value of the sobel_v is obtained and the absolute value of the sobel_v is subjected to 3-bit right shift. The absolute value of the sobel_v is 0 to 60, so that the sobel_v having been subjected to the 3-bit right shift is normalized within the range of 0 to 7. Such normalization makes it possible to set, to 8×8, the size of a matrix storing pattern numbers (ids) to be used by the pattern ID calculator 304 (described below). The normalized sobel_v is then output to the pattern ID calculator 304. The above shift amount may be adjusted according to a matrix size of the pattern ID calculator 304 to be described below.

The processing to be performed by the SobelH calculator 303 is similar to that to be performed by the SobelV calculator 302 with the only exception that the filter coefficients used for the convolution operation are changed to filter coefficients of a Sobel filter illustrated in FIG. 5B that allows the detection of a horizontal edge. Thus, a detailed description thereof is omitted.

As described above, not pattern matching but a filter is used to determine the intensity and direction of an edge.

Pattern ID Calculator 304

The pattern ID calculator 304 uses a two-dimensional matrix to calculate a pattern number (id) to be used by the conversion pattern acquirer 307 (described below) from the sobel_v and the sobel_h, which are received from the edge detection unit 301. The pattern ID calculator 304 is detailed with reference to FIG. 6. FIG. 6 is a conceptual diagram of a two-dimensional matrix to be used by the pattern ID calculator 304. An area 601 is an area of id=0, an area 602 is an area of id=1, an area 603 is an area of id=2, and an area 604 is an area of id=3.

The pattern ID calculator 304 uses the received sobel_v as a row index and the received sobel_h as a column index to acquire an id number. If the sobel_v is 1 and the sobel_h is 2, the id is 0.

In the present exemplary embodiment, the value of id takes values 0 to 3 to set the number of patterns to four. In another exemplary embodiment, the range and arrangement places of the values of id may be adjusted according to the number of patterns to be held.

Modulator 305

The modulator 305 uses a one-dimensional LUT to modulate a 4-bit signal value (also referred to as pixel value or tone value) of the pixel of interest to a 5-bit signal value, and outputs the 5-bit signal value to the binary pattern calculator 308. FIG. 7 is a diagram illustrating an example of the LUT to be used by the modulator 305. Input signal values are indicated in a left column and output signal values in a right column. If the input signal value is 15, the maximum 4-bit value, the output signal value is 16.

Pattern Conversion Unit 306

The pattern conversion unit 306 (the conversion pattern acquirer 307 and the binary pattern calculator 308) is a processing unit that acquires a conversion pattern and actually converts a 1×1 pixel of 600×600 dpi into 4×4 pixels of 2400×2400 dpi. In the pattern conversion unit 306, the conversion pattern acquirer 307 acquires a conversion pattern, the binary pattern calculator 308 calculates pixels after conversion, and the pixel conversion is performed.

The acquisition of a conversion pattern is initially described. The conversion pattern acquirer 307 uses three pieces of information, namely, the received id, minus-sign_v, and minus_sign_h to acquire a conversion pattern.

Figure 8:
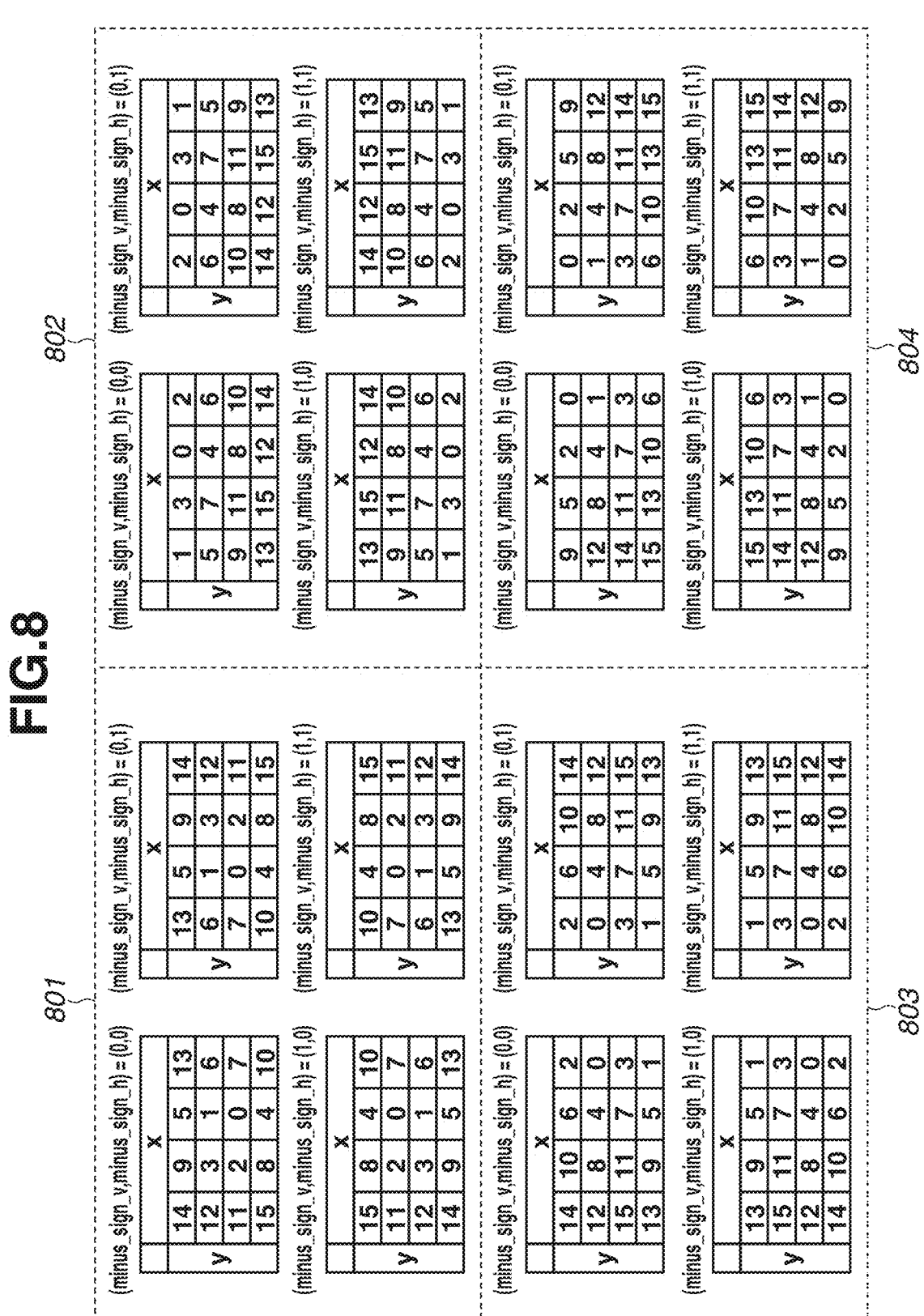
FIG. 8 is a diagram illustrating an example of conversion patterns used for resolution conversion.

FIG. 8 illustrates conversion patterns in the present exemplary embodiment. Conversion patterns 801, 802, 803, and 804 are conversion patterns in the cases of id=0, id=1, id=2, and id=3, respectively. Numerical values in a conversion pattern are to be compared with a signal value of the pixel of interest, and indicate such an order that a pixel with a smaller numerical value in the pattern is made to be a black pixel (dot turned ON) earlier. In the conversion pattern 801, the numerical values are made larger from the center, so that it is understood that black pixels after conversion increase from the center as the signal value of the pixel of interest becomes higher. In the description below, the conversion patterns 801, 802, 803, and 804 are referred to as a central growth pattern, a horizontal growth pattern, a vertical growth pattern, and an oblique growth pattern, respectively.

The central growth pattern 801, the horizontal growth pattern 802, the vertical growth pattern 803, and the oblique growth pattern 804 each hold four conversion patterns. The reason is that the direction of growth is flipped over even under the same id, depending on the received minus_sign_v (vertical edge direction) and minus_sign_h (horizontal edge direction). In the case of minus_sign_v=1 (i.e., the case where the vertical edge direction is opposite), a conversion pattern in the upper left of the central growth pattern 801 is flipped vertically. Similarly, the conversion pattern in the upper left is flipped horizontally in the case of minus_sign_h=1, and is flipped horizontally and vertically if the minus_sign_v and the minus_sign_h are both 1. Referring now to FIGS. 9A and 9B, an example of the acquisition of a specific conversion pattern will be described. FIGS. 9A to 9D are diagrams illustrating exemplary operations, from the acquisition of a conversion pattern to the pixel conversion.

FIG. 9A illustrates some 3×3 pixels in an HT image of 600×600 dpi to be input to the edge detection unit 301, with the center pixel serving as the pixel of interest. Numerical values in FIG. 9A indicate (4-bit) signal values.

When the pixels in FIG. 9A are processed according to the flowchart in FIG. 4 as above, a sobel_v of 5, a minus_sign_v of 1, a sobel_h of 5, and a minus_sign_h of 1 are obtained. Then, the pattern ID calculator 304 acquires an id of 3, and the conversion pattern acquirer 307 acquires a conversion pattern in an area of id=3, in other words, in the oblique growth pattern 804. Since the minus_sign_v and the minus_sign_h are both 1, a conversion pattern in a lower right of the oblique growth pattern 804 is to be acquired. The acquired conversion pattern is illustrated in FIG. 9B. The acquisition of a conversion pattern is thus described specifically.

Next, an example of pixel conversion using a conversion pattern is described with reference to FIGS. 9A to 9D. FIG. 9C illustrates a pixel that is the pixel of interest illustrated in FIG. 9A and has been modulated by the modulator 305. FIG. 9D illustrates the result of pattern conversion performed on the pixel in FIG. 9C.

The binary pattern calculator 308 makes a comparison between the pixel in FIG. 9C received from the modulator 305 and the numerical values in the conversion pattern in FIG. 9B and sets, to black pixels, portions with numerical values in the conversion pattern smaller than the signal value of the pixel in FIG. 9C. The binary pattern calculator 308 further sets the other places to white pixels. FIG. 9D illustrates the results. It is seen that the portions in FIG. 9B with a numerical value smaller than the signal value 8 are each turned into a black pixel.

If an oblique edge is present in an HT image, as illustrated in FIG. 9A, the conversion pattern of oblique growth illustrated in FIG. 9B is used (i.e., replacement with the conversion pattern is performed), thus converting the HT image into an HT image with the smoothing effect, such as one illustrated in FIG. 9D in which black pixels are clustered diagonally down left. In other words, for edge pixels in an HT image, a conversion pattern corresponding to the edge direction thereof is used so that an HT image where the smoothing effect is achieved is obtained, and a central growth pattern is used for the pixels other than the edge pixels, thus performing an appropriate resolution conversion on the HT image.

In addition, the present exemplary embodiment has a simple configuration in which a process with a 3×3 edge detection filter and the calculated edge direction and edge intensity values are used to acquire a conversion pattern, which further reduces the circuit scale. In the present exemplary embodiment, a description has been provided in the case where an image with a resolution of 600×600 dpi is converted into an image with a resolution of 2400×2400 dpi. It is needless to say that any other resolution is usable as a resolution before or after the conversion.

A second exemplary embodiment of the present disclosure will be described below. In the first exemplary embodiment described above, four conversion patterns are held for each growth pattern, the pattern to be acquired is changed depending on the id (which growth pattern is concerned), the minus_sign_v (vertical edge direction), and the minus_sign_h (horizontal edge direction), and the resolution conversion process is performed.

It is also conceivable that only one conversion pattern is held for each growth pattern, the acquired conversion pattern is subjected to inversion calculation depending on the vertical and horizontal edge directions, and the resolution conversion process is performed. In that case, the total number of conversion patterns is further reduced from 16 to 4.

In the second exemplary embodiment, a description will be provided of the above case where a growth pattern is subjected to the inversion calculation and the resolution conversion process is performed. In the description below, only differences between the first and second exemplary embodiments are detailed.

What make the second exemplary embodiment different from the first exemplary embodiment are conversion patterns to be held and the conversion pattern acquirer 307.

Figure 10:
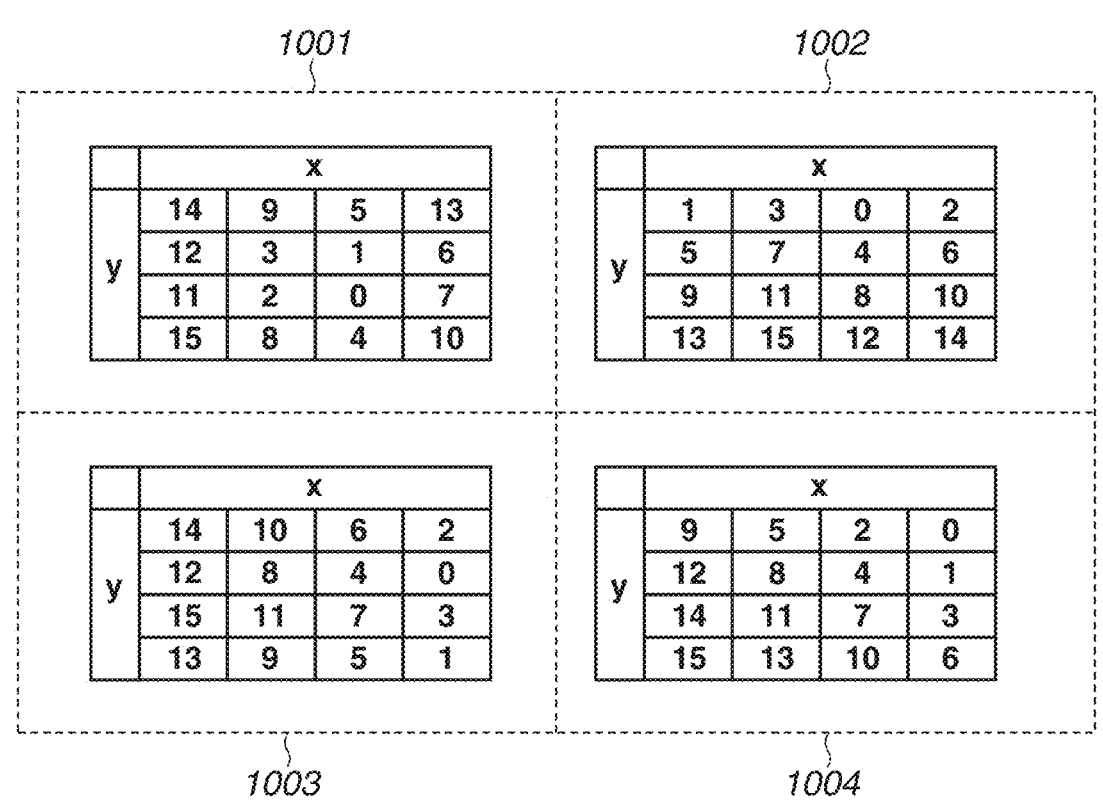
FIG. 10 is a diagram illustrating an example of conversion patterns used for resolution conversion in a second exemplary embodiment.

Initially, the conversion patterns to be held are described with reference to FIG. 10. FIG. 10 illustrates the conversion patterns to be held according to the second exemplary embodiment. An area 1001 is an area of id=0 (central growth), an area 1002 is an area of id=1 (horizontal growth), an area 1003 is an area of id=2 (vertical growth), and an area 1004 is an area of id=3 (oblique growth). Unlike the first exemplary embodiment, the conversion patterns to be held are four in total. The four conversion patterns are subjected to the inversion calculation to use.

Figure 11:
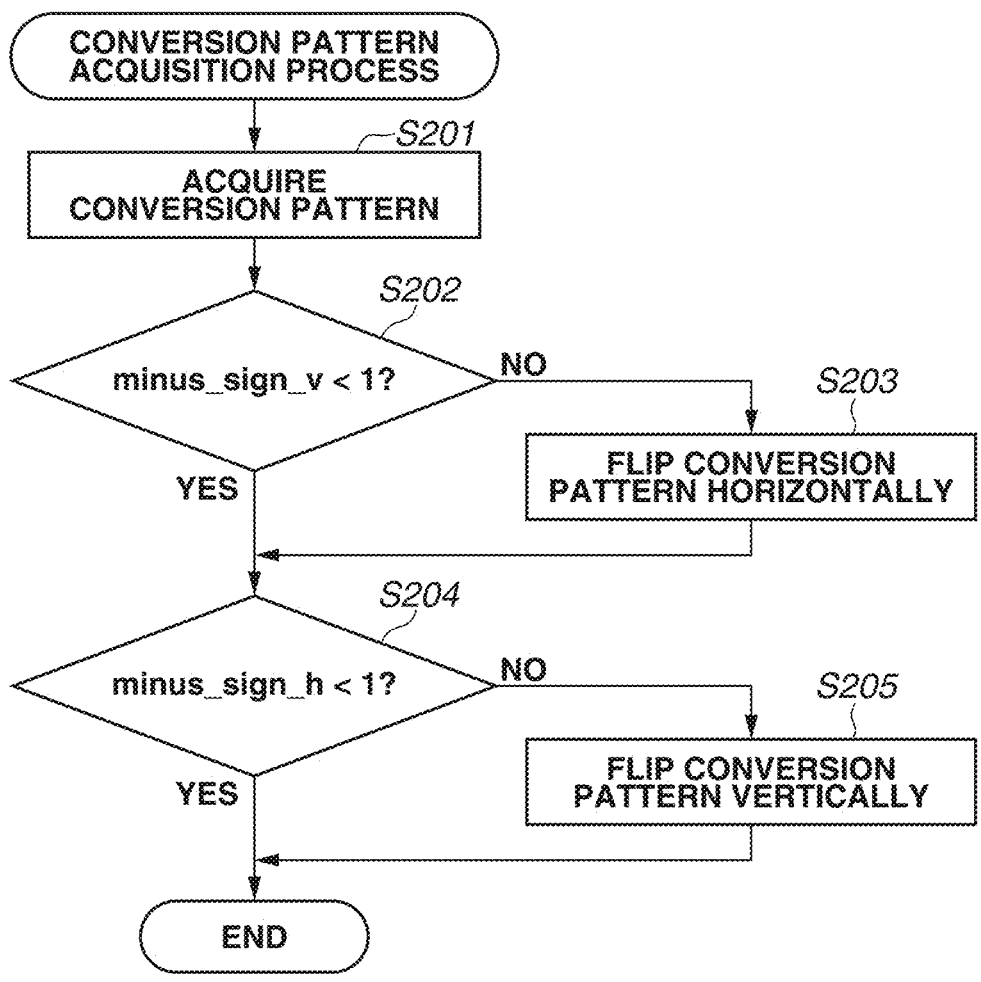
FIG. 11 is a flowchart of a process to be performed by a conversion pattern acquirer in the second exemplary embodiment.

Next, a process to be performed by the conversion pattern acquirer 307 in the second exemplary embodiment will be described with reference to FIG. 11. FIG. 11 is a flowchart of the process to be performed by the conversion pattern acquirer 307.

Initially in step S201, a conversion pattern is acquired based on the id.

Next in step S202, it is determined whether the minus_sign_v is smaller than 1. The processing proceeds to step S204 if the minus_sign_v is smaller than 1, or to step S203 if the minus_sign_v is not smaller than 1.

If the processing proceeds to step S203, the conversion pattern acquired in step S201 is flipped horizontally in step S203, then the processing proceeds to step S204.

In step S204, it is determined whether the minus_sign_h is smaller than 1. The processing is ended if the minus_sign_h is smaller than 1, or proceeds to step S205 if the minus_sign_h is not smaller than 1.

In step S205, the conversion pattern is turned upside down.

A specific example of conversion pattern acquisition in the case of id=3, minus_sign_v=1, and minus_sign_h=1 will now be described with reference to FIGS. 12A to 12C. FIGS. 12A to 12C illustrate the result of the process following the flow in FIG. 11.

In the case of id=3, a conversion pattern illustrated in FIG. 12A is initially acquired.

Since the minus_sign_v is 1, the conversion pattern in FIG. 12A is then flipped horizontally, so that a conversion pattern in FIG. 12B is obtained.

Since the minus_sign_h is 1, the conversion pattern in FIG. 12B is turned upside down, so that a conversion pattern in FIG. 12C is obtained. The details of the process performed by the conversion pattern acquirer 307 in the second exemplary embodiment are thus described.

After the acquisition of a conversion pattern, the binary pattern calculator 308 receives the conversion pattern from the conversion pattern acquirer 307 and performs the resolution conversion process, as in the first exemplary embodiment.

As described above, even if only one conversion pattern is held for each direction of growth, a resolution conversion process similar to that in the first exemplary embodiment is achieved by subjecting the acquired conversion pattern to the inversion calculation depending on the edge direction.

According to the present disclosure, it is possible to perform the resolution conversion, from which an improvement in image quality is expected, while restricting the circuit scale.

Other Embodiments

Some embodiment(s) of the present disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2021-193805, which was filed on Nov. 30, 2021 and which is hereby incorporated by reference herein in its entirety.

What is claimed is:

1. An image processing device comprising:

at least one memory that stores instructions; and at least one processor that causes, by executing the instructions, the image processing device to:

calculate a direction of an edge and an intensity of the edge from image data of a first resolution;

select, based on the direction of the edge and the intensity of the edge from among a plurality of conversion patterns, a conversion pattern for converting the image data of the first resolution to binary image data of a second resolution higher than the first resolution;

generate an inversion pattern by inverting, based on the direction of the edge, the selected conversion pattern; and convert, using the generated inversion pattern, the image data of the first resolution into the binary image data of the second resolution.

2. The image processing device according to claim 1, wherein the direction of the edge and the intensity of the edge are calculated using a Sobel filter.

3. The image processing device according to claim 2, wherein the direction of the edge and the intensity of the edge are calculated using the Sobel filter without using pattern matching on the image data of the first resolution.

4. The image processing device according to claim 1, wherein the first resolution is 600 dpi and the second resolution is 2400 dpi.

5. The image processing device according to claim 1, further comprising a scanner that reads an image of an original.

6. The image processing device according to claim 1, further comprising a printer that forms an image on a sheet.

7. A method for controlling an image processing device, the method comprising:

calculating, as edge detection, a direction of an edge and an intensity of the edge from image data of a first resolution;

selecting, based on the direction of the edge and the intensity of the edge from among a plurality of conversion patterns, a conversion pattern for converting the image data of the first resolution to binary image data of a second resolution higher than the first resolution;

generating an inversion pattern by inverting, based on the direction of the edge, the selected conversion pattern; and converting, using the generated inversion pattern, the image data of the first resolution into the binary image data of the second resolution.

8. The method for controlling the image processing device according to claim 7, wherein the direction of the edge and the intensity of the edge are calculated using a Sobel filter.

9. The method for controlling the image processing device according to claim 8, wherein the direction of the edge and the intensity of the edge are calculated using the Sobel filter without using pattern matching on the image data of the first resolution.

10. A non-transitory computer-readable storage medium storing a program for causing a computer to execute a method for controlling an image processing device, the method comprising:

calculating a direction of an edge and an intensity of the edge from image data of a first resolution;

selecting, based on the direction of the edge and the intensity of the edge from among a plurality of conversion patterns, a conversion pattern for converting the image data of the first resolution to binary image data of a second resolution higher than the first resolution;

generating an inversion pattern by inverting, based on the direction of the edge, the selected conversion pattern; and converting, using the generated inversion pattern, the image data of the first resolution into the binary image data of the second resolution.

* * * * *